(12) United States Patent
Ananthanarayanan et al.

(10) Patent No.: US 10,089,390 B2
(45) Date of Patent: Oct. 2, 2018

(54) SYSTEM AND METHOD TO EXTRACT MODELS FROM SEMI-STRUCTURED DOCUMENTS

(75) Inventors: Rema Ananthanarayanan, New Delhi (IN); Anuradha Bhamidipaty, Bangalore (IN); Krishna Kummamuru, Hyderabad (IN); Debdoot Mukherjee, West Bengal (IN); Deepak S. Padmanabhan, Kerala (IN); Vibha Singhal Sinha, New Delhi (IN); Biplav Srivastava, Noida (IN)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 12/890,060

(22) Filed: Sep. 24, 2010

(65) Prior Publication Data
US 2012/0078969 A1   Mar. 29, 2012

(51) Int. Cl.
G06F 17/30 (2006.01)
(52) U.S. Cl.
CPC .................. G06F 17/3071 (2013.01)
(58) Field of Classification Search
USPC ......................................................... 707/798
See application file for complete search history.

(56) References Cited

U.S. PATENT DOCUMENTS

| | | | |
|---|---|---|---|
| 6,418,433 B1 | 7/2002 | Chakrabarti et al. | |
| 6,606,620 B1 | 8/2003 | Sundaresan et al. | |
| 6,754,650 B2 | 6/2004 | Cho et al. | |
| 6,826,568 B2 | 11/2004 | Bernstein et al. | |
| 6,886,010 B2 | 4/2005 | Kostoff | |
| 7,131,057 B1 | 10/2006 | Ferrucci et al. | |
| 7,366,705 B2 | 4/2008 | Zeng et al. | |
| 7,552,109 B2 | 6/2009 | Balasubramanian et al. | |
| 7,558,766 B1 | 7/2009 | Forman | |
| 75,620,601 | 7/2009 | Sindhwani et al. | |
| 7,627,588 B1 | 12/2009 | Mohan et al. | |
| 7,685,083 B2 | 3/2010 | Fairweather | |
| 2001/0037324 A1* | 11/2001 | Agrawal et al. | 707/1 |
| 2003/0135826 A1* | 7/2003 | Dozier | G06F 17/30014 715/206 |
| 2007/0078880 A1 | 4/2007 | Eiron et al. | |

(Continued)

OTHER PUBLICATIONS

Buckl, Sabine, et al., "Wiki-Based Approach to Enterprise Architecture Documentation and Analysis", 17th European Conference on Information Systems, available at http://www.ecis2009.it/papers/ecis2009-0392.pdf.

(Continued)

Primary Examiner — Charles D Adams
(74) Attorney, Agent, or Firm — Ference & Associates, LLC

(57) ABSTRACT

Systems and associated methods for automated and semi-automated building of domain models for documents are described. Embodiments provide an approach to discover an information model by mining documentation about a particular domain captured in the documents. Embodiments classify the documents into one or more types corresponding to concepts using indicative words, identify candidate model elements (concepts) for document types, identify relationships both within and across document types, and consolidate and learn a global model for the domain.

10 Claims, 10 Drawing Sheets

(56) References Cited

U.S. PATENT DOCUMENTS

| | | | |
|---|---|---|---|
| 2008/0249999 A1 | 10/2008 | Renders et al. | |
| 2009/0030862 A1 | 1/2009 | King et al. | |
| 2009/0076989 A1 | 3/2009 | Probst et al. | |
| 2009/0083200 A1* | 3/2009 | Pollara et al. | 706/14 |
| 2009/0099988 A1 | 4/2009 | Stokes et al. | |
| 2009/0216693 A1* | 8/2009 | Rujan et al. | 706/12 |
| 2011/0145178 A1* | 6/2011 | Schmidtler et al. | 706/12 |

OTHER PUBLICATIONS

Lutsky, Patricia, et al., "Information extraction from documents for automating software testing", Artificial Intelligence in Engineering 14 (2000) 63-69, Elsevier Science Ltd., available at :http://www.sciencedirect.com/science?_ob=ArticleURL&_udi=B6V1X-3YJYR0W-6&_user=10&_coverDate=01%2F31%2F2000&_rdoc=1&_fmt=high&_orig=search&_sort=d&_docanchor=&view=c&_searchStrId=1313807163&_rerunOrigin=google&_acct=C000050221&_version=1&_urlVersion=0&_userid=10&md5=4521ab641ad3574781683a301454831a.

Carlson, Andrew, et al., "Bootstrapping Information Extraction from Semi-structured Web Pages", Proceedings of the European Conference on Machine Learning and Principles and Practice of Knowledge Discovery in Databases, 2008, available at http://www.cs.cmu.edu/~acarlson/papers/carlson-ecml08.pdf.

Graupner, Sven, et al., "Making Processes from Best Practice Frameworks Actionable", HP Laboratories, HLP-2009-196, 3rd Business-driven IT Management, Long Island. NY, Jun. 1-5, 2009. available at http://www.hpl.hp.com/techreports/2009/HPL-2009-196.pdf.

Badr, Y., et al., "Transformation Rules from Semi-structured XML Documents to Database Model", IEEE, downloaded on May 5, 2010, at 11:45:12 UTC from IEEE Explore, available at URL:http://www.computer.org/portal/web/csdl/doi/10.1109/AICCSA.2001.933972.

Hemnani, Ajay, et al., "Extracting Information from Semi-structured Web Documents", OOIS 2002 Workshops, LNCS 2426, pp. 166-175, 2002, Springer-Verland Berlin Heidelberg 2002, available at http://www.springerlink.com/content/mxwqhnvvnpak61f0/.

Viola, Paul, et al., "Learning to Extract Information from Semi-structured Text using a Discriminative Context Free Grammar", draft submitted to the conference SIGIR 2005, available at http://research.microsoft.com/en-us/um/people/viola/pubs/docextract/contact_sigir05.pdf.

Memon, Nasrullah, et al., "Extracting Information from Semi-structured Web Documents: A Framework", APWeb 2008 Workshops, LNCS 4977, pp. 54-64, 2008, available at http://www.springerlink.com/content/I0202r444m408g37/.

* cited by examiner

SYSTEM AND METHOD TO EXTRACT MODELS FROM SEMI-STRUCTURED DOCUMENTS

BACKGROUND

Documents are created widely in enterprises using commercial word processors in tool suites like Microsoft Office® word processing software, Lotus Symphony™ word processing software, and OpenOffice.org® word processing software. However, once created, it is very difficult to reuse content from these documents despite significant progress made in keyword searching and social tagging. Microsoft Office® is a registered trademark of Microsoft Corp. in the United States and other countries. OpenOffice.org® is a registered trademark of Oracle America, Inc. in the United States and other countries.

A promising approach to retrieve content is semantic search, where documents are queried based on a formal representation of the domain concepts inherent in those documents and their possible relations. Similarly, to build high-quality information systems, the trend is to use Model-driven Architecture and Design (MDA/MDD), wherein concepts of the domain are captured as models and used at every stage of development to keep the system implementation on track. For these and other applications, it is important to have detailed domain models.

However, building the models from scratch is time-consuming and cumbersome. A bottleneck issue is the availability of qualified domain experts. In enterprise settings, it is quite common to have large development projects spread across multiple locations and spanning months and many teams. Different teams are engaged in complementary activities for the project and create different types of documentation as output. Over time, the participants become experts in domain concept(s) corresponding to the activities they were engaged in. However, for a complicated domain, no single person may be the authoritative expert.

BRIEF SUMMARY

Systems and associated methods for automated and semi-automated building of domain models for documents are described. Embodiments provide an approach, which can be semi-automated, to discover an information model by mining documentation about a particular domain captured in the documents. Embodiments classify the documents into one or more types corresponding to concepts. Embodiments automatically harvest documents to separate content from presentation, identify candidate model elements (concepts) within a document type, identify relationships both within and across document types, and consolidate and learn a global model for the domain. Certain embodiments also allow for manual review in a guided manner to resolve domain-specific ambiguity to minimize errors.

In summary, one aspect provides a method for producing a global model describing a collection of documents comprising: accessing a collection of documents, the collection of documents comprising labeled documents and unlabeled documents; receiving input identifying indicative words for classifications; generating a classification model; classifying documents of the collection of documents to produce classified documents of one or more types; extracting concepts from the classified documents; generating a global model from the concepts; and outputting the global model.

Another aspect provides a computer program product for producing a global model describing a collection of documents comprising: a computer readable storage medium having computer readable program code embodied therewith, the computer readable program code comprising: computer readable program code configured to access a collection of documents, the collection of documents comprising labeled documents and unlabeled documents; computer readable program code configured to ascertain input identifying indicative words for classifications; computer readable program code configured to generate a classification model; computer readable program code configured to classify documents of the collection of documents to produce classified documents of one or more types; computer readable program code configured to extract concepts from the classified documents; computer readable program code configured to generate a global model from the concepts; and computer readable program code configured to output the global model.

A further aspect provides a system for producing a global model describing a collection of documents comprising: one or more processors; and a memory operatively connected to the one or more processors; wherein, responsive to execution of computer readable program code accessible to the one or more processors, the one or more processors are configured to: access a collection of documents, the collection of documents comprising labeled documents and unlabeled documents; receive input identifying indicative words for classifications; generate a classification model; classify documents of the collection of documents to produce classified documents of one or more types; extract concepts from the classified documents; generate a global model from the concepts; and output the global model.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

The description now turns to the figures. The illustrated example embodiments will be best understood by reference to the figures. The following description is intended only by way of example and simply illustrates certain example embodiments representative of the invention, as claimed.

As described herein, building models from scratch is time-consuming and cumbersome, particularly for a complicated domain, where no single person may be the authoritative expert. An example of such a domain is a multi-year business transformation project using packaged applications. These projects involve hundreds of consultants, and many types of documents are created during design, dealing all the way from process description to data conversions and testing.

Figure 1:
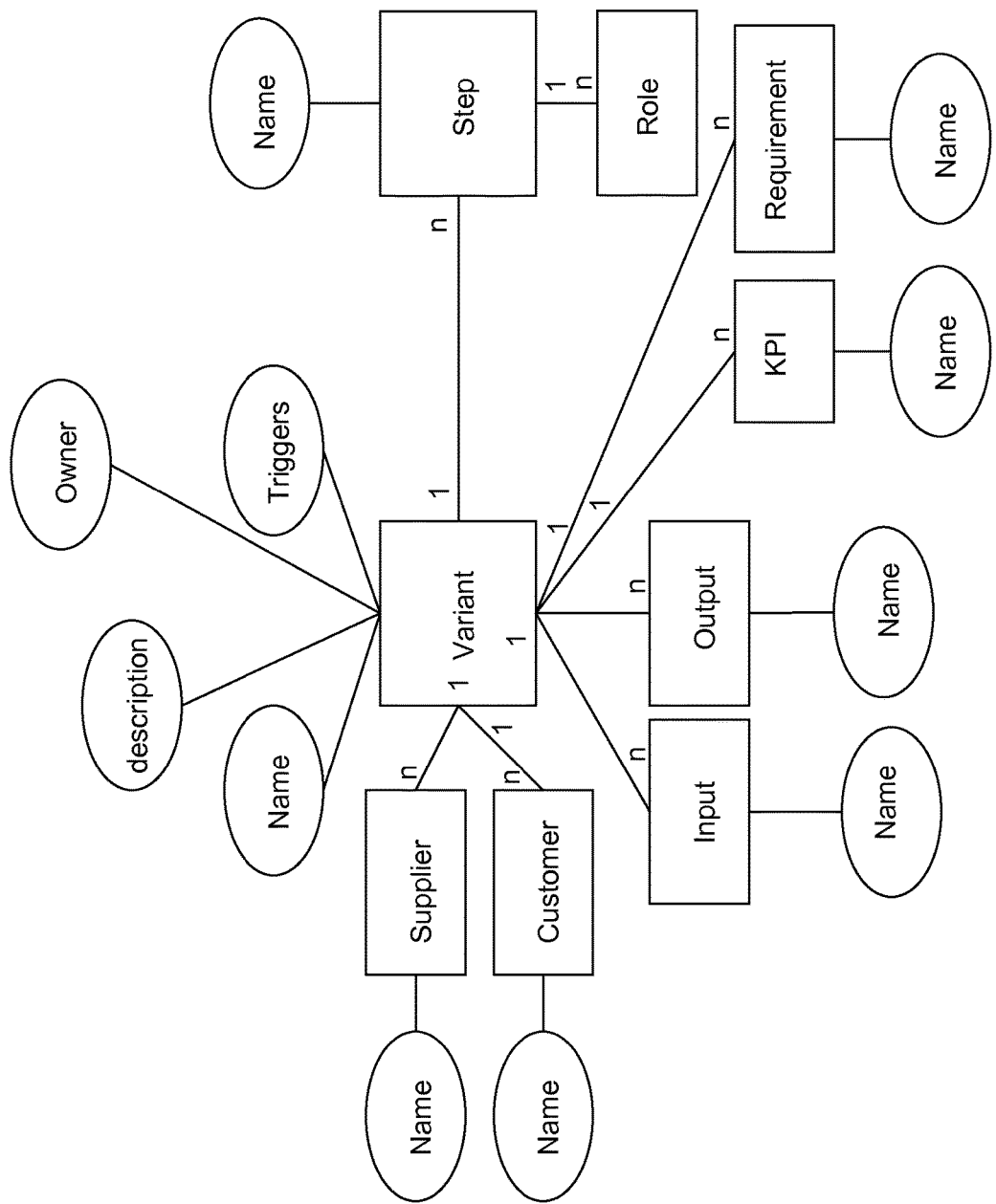
FIG. 1 illustrates a model fragment.

No single expert knows the global model of these projects, while its sub-models are evidenced in the different document types. For example, project workers collaborate with business consultants (domain experts) to create a sub-model for a customization domain, for example that rejects information captured in two document types. Such a sub-model can take upwards of two weeks to build manually. The manual building process includes interviewing subject matter experts, browsing through project documents, and having different experts negotiate to build a consensus. Then, it may take many months to stabilize the sub-model. FIG. 1 illustrates a fragment of a model provided by experts. The prohibitive effort in extending this fragment (partial or sub-model) to information in other document types (to produce a global model) highlights a particular need for automated and/or semi-automated model generation.

An appealing approach to bootstrap the model acquisition gap is to learn the model from secondary data sources like design diagrams. However, there is no existing approach to learn models from enterprise documents that are created by word processors where the domain model is fragmented into sub-models, as reflected in the different document types.

Accordingly, embodiments fill this gap with methods to automatically harvest documents to separate content from presentation, identify candidate sub-model elements within a document type, identify relationships across document types, consolidate and learn the aggregated (global) model of the domain; and provide well-defined manual review steps to make domain-specific decisions.

Some terminology is summarized in order to remove possible confusion of usage of certain terms from other contexts.

Document: A document captures the output of a specific activity of interest in a domain. At its simplest, a document is a collection of plain text with some formatting information for the text. In addition, the document can contain objects such as diagrams (for example, entity-relation) and multi-media objects.

Semi-structured document: A semi-structured document is a type of document whose content is optionally structured with formatting constructs (like document title, section headings and appendix). A semi-structured document can be represented in XML format. All documents described in connection with the example embodiments herein are semi-structured documents.

Document Type (Category): A document type records the output of a type of sub-activity of interest in the domain. For example, consider the domain of telecommunications. An enterprise may be engaged in software development for this domain and generate different documents. During software development for telecommunications, acceptance test specifications is a specific type of document that specifies the checks needed to prove that the software meets the stated requirements. The set of documents created during software development for telecommunication is recorded by a set of documents, D, made up of documents, $d_i$. Each document is of a particular type, $t_j$, corresponding to some sub-activity in the domain (for example, acceptance testing). Hence, the set D is also $\{\prec D_j, t_j \succ\}$ where $D_j = \{d_i \text{ s.t. type } (d_i) = t_j\}$.

Concept: A concept is a term or phrase that denotes some meaningful information in the domain of interest. Concepts are linked to each other through relationships.

Relationship: A relationship denotes how concepts are related to one another.

Model: A model is a representation of a collection of concepts and relationships between them.

In enterprises, team-based document creation is widespread. Such documents typically start from mandated templates but end up with rich variance. Hence, although templates aim to reduce document structural variations, they cannot prevent them. Ideally, these documents are stored in repositories and can be later accessed by key word based searching for reuse by others.

To distinguish embodiments from prior works, it should be understood that a common thread missing in prior works is the discovery of an underlying global model that takes into account the different local or smaller sources. The global model may then be used for querying the various sources uniformly, eliminating duplicates and identifying new sources. Embodiments assume that the various sub-models are implicit in the document types, and look at the problem of identifying the concepts and the relationships across these in the aggregated model (loosely also called the global model). The global model provides an integrated view of the documents through the life cycle of the project, where refinements or improvements filter down to the individual sub-models. The output is useful, in and among other things, to generate software tools and support semantic query.

To formalize the problem, consider a document collection D and each of its documents $d_i$ belongs to a document type $t_j$. A document type has associated with it, explicitly or implicitly, a set of concepts C. The concepts are formally represented as models (M), a graphical representation, where nodes ($M_n$) represent concepts and edges $M_e$ represent relationships between nodes.

Each document type $t_i$ records a fragment of the global model M, represented $M_{t_i}$. Further, $M \supseteq \cup_i M_{t_i}$, since all available document types may still not record the global model. The aggregate of all the sub-models is referred to as the global model since the only evidence of the domain is from the available document types. The problem is to automatically or semi-automatically learn model fragments such as in FIG. 1 from formatted, structured documents created by word processors.

Putting the problem more precisely, given a set of documents from some domain, the goals are:

1. Find the sub-models $M_{t_j}$ corresponding to each document type $t_j$
2. Find the aggregate model M.

Figure 2:
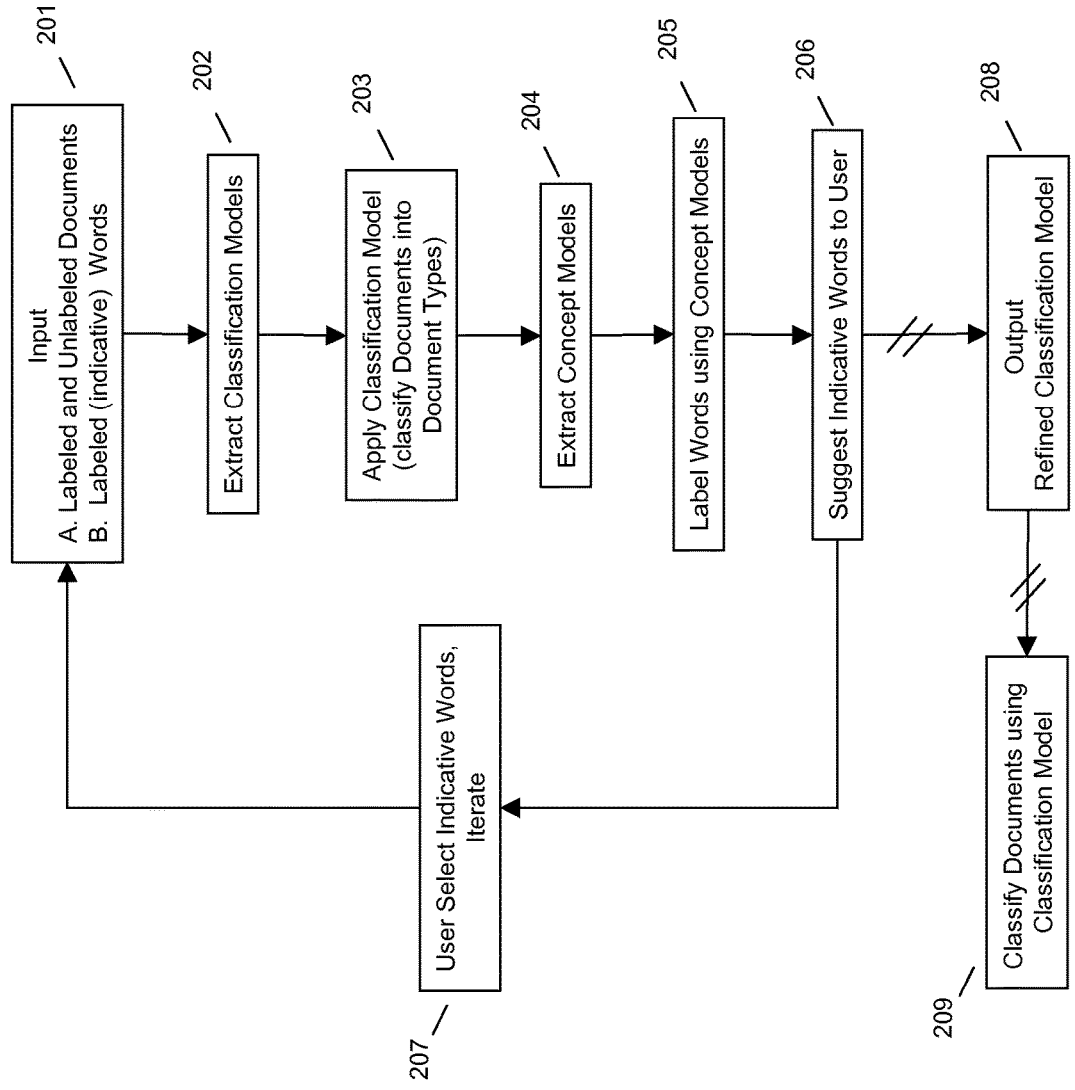
FIG. 2 illustrates a method for document classification.
Figure 3:
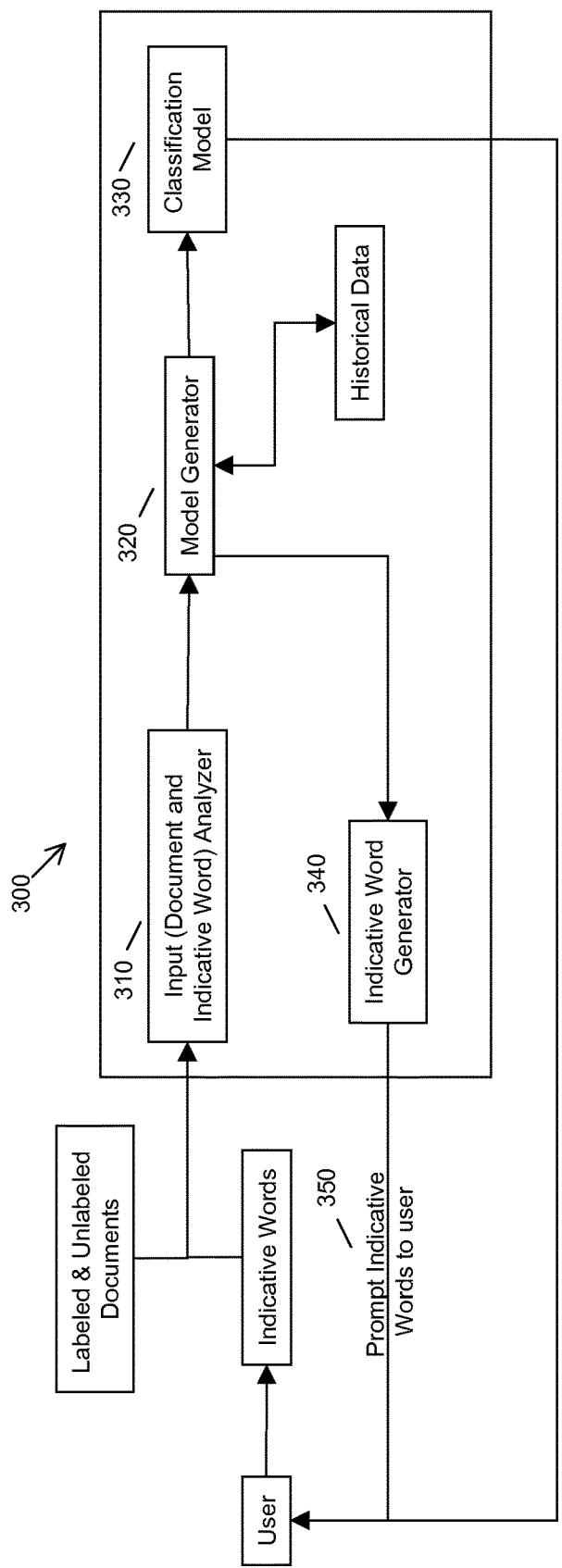
FIG. 3 illustrates a system for document classification.
Figure 4:
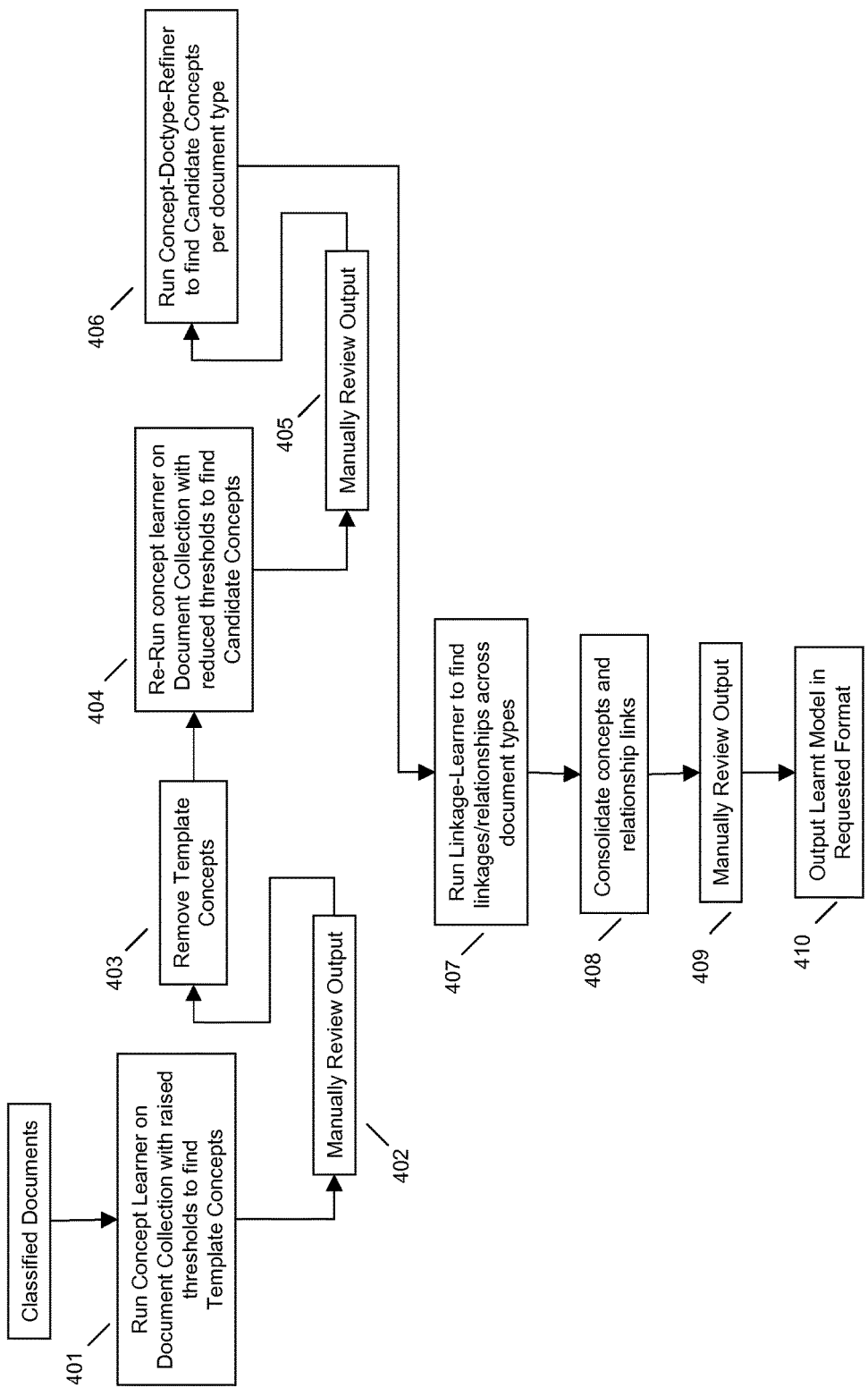
FIG. 4 illustrates a method for learning a global model.

Embodiments solve this problem using an approach that handles the noise and variability of the individual documents, the fragmentation of domain models as evidenced in different document types, and the need to have a user review, enhance and work productively with the resulting aggregate or global model. An example approach for classifying documents based on concepts is illustrated in FIGS. 2-3. A high level flow of an example approach utilized by embodiments to find a global model is illustrated in FIG. 4, with further details provided in FIGS. 5-7.

Embodiments assist in classifying documents. Limited labeled data and a large supply of unlabeled data is quite the norm. Current semi-supervised classification approaches use only the labeled and unlabeled data to train classifiers by estimating parameters of a generative model through iterative EM techniques and use active learning; that is, picking unlabeled examples which when labeled "manually" can provide maximum information and improve classification.

It is possible for a user to provide descriptive or discriminative words (hereinafter, "indicative words") for classification in addition to the labeled examples. Current approaches do not consider this input to build the classification model.

Indicative words can provide very useful information to help converge the hypothesis space faster and this does not require "user's presence" to classify confusing examples. The readily apparent business value provided by embodiments affording such indicative word assisted classification of documents includes a novel, semi-supervised classification process that can be put to use in many instances of knowledge management problems faced in Service Delivery.

Referring to FIG. 2, embodiments take as input 201 a set of documents and a few labeled (indicative) words. Embodiments extract classification models 202 and apply 203 the classification model to the documents to identify document types (that is, classify the documents). While any number of classification models may be utilized, a naïve Bayes classification scheme is suitable, whereby documents are classified based on content (for example, key words and phrases) using a probability of belonging to a particular classification given the key words/phrases. From the classifications, embodiments can extract concepts (underlying meaning or topic) to build a concept model 204 establishing relationships between the concepts. Based on the concepts extracted, embodiments can label words 205.

These labeled words (also referred to herein as indicative words) can be suggested 206 to the user. The user can select from these suggestions to iterate the process 207 until no further gains are made. Once the classification of documents has reached a maximum gain, a final output consists of a refined classification model 208, which can be used to accurately classify documents (209), including additional unlabeled/unclassified documents.

Referring now to FIG. 3, an example system for document classification is illustrated. The system 300 takes as input a set of documents and a few labeled (indicative) words into an input analyzer 310. The input analyzer 310 feeds a model generator module 320, which constructs a model given the input and produces a classification model 330. Historical data may be of use in forming the classification model 330. As above, suggested indicative words 340 can be fed back to the user 350 and the process iterated until a refined classification model is produced which can be utilized to classify documents.

Referring to FIG. 4, embodiments utilize these classified documents to extract concepts or relationships within and among the documents. Once classified documents are available for input, in steps 401, 402 and 403, embodiments first identify model elements that may have been used to structure the documents (that is, control metadata or template concepts). Such elements are organization or project specific and do not necessarily reflect any domain concept.

Figure 5:
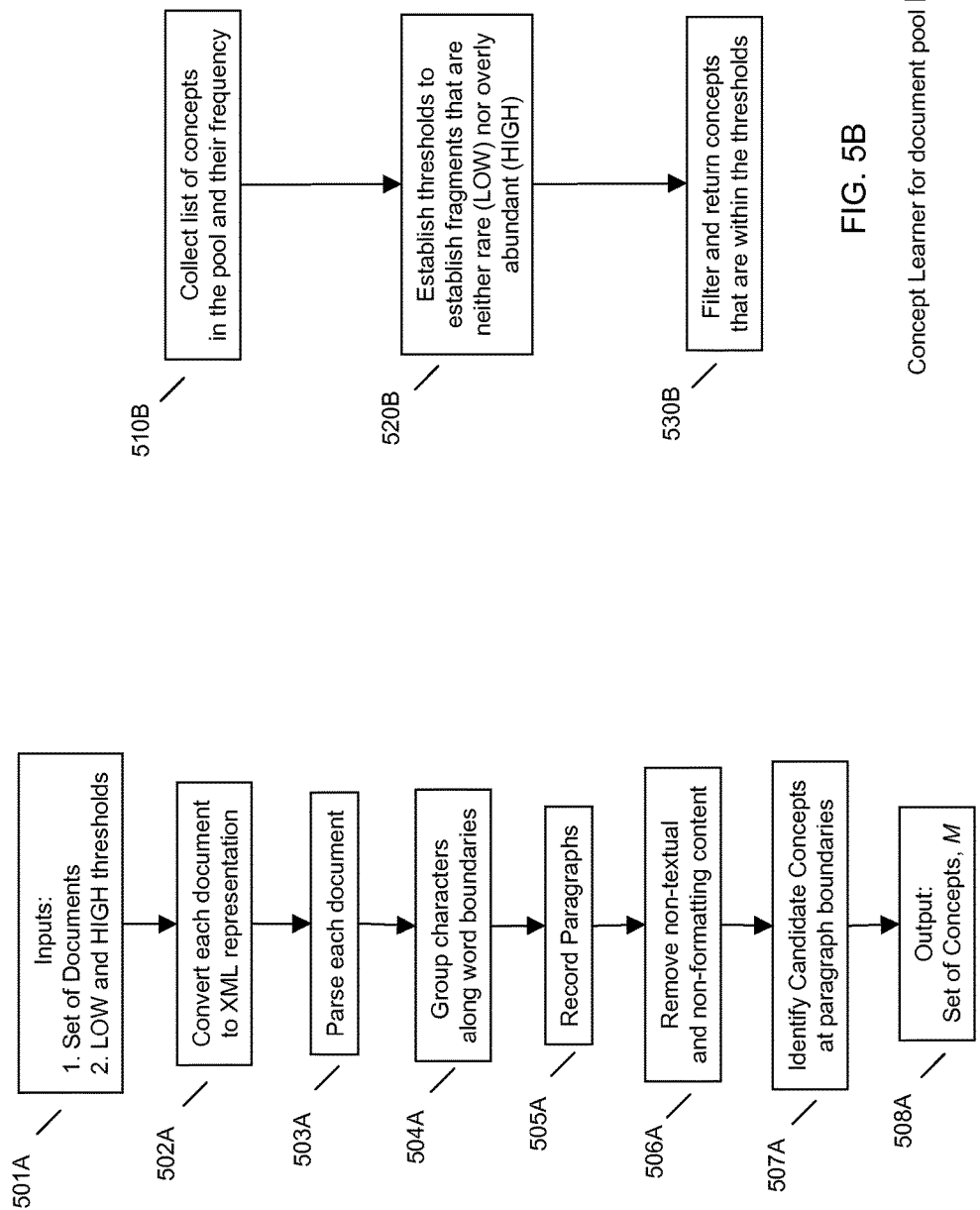
FIG. 5A-B illustrates a method for concept learning from documents.
Figure 6:
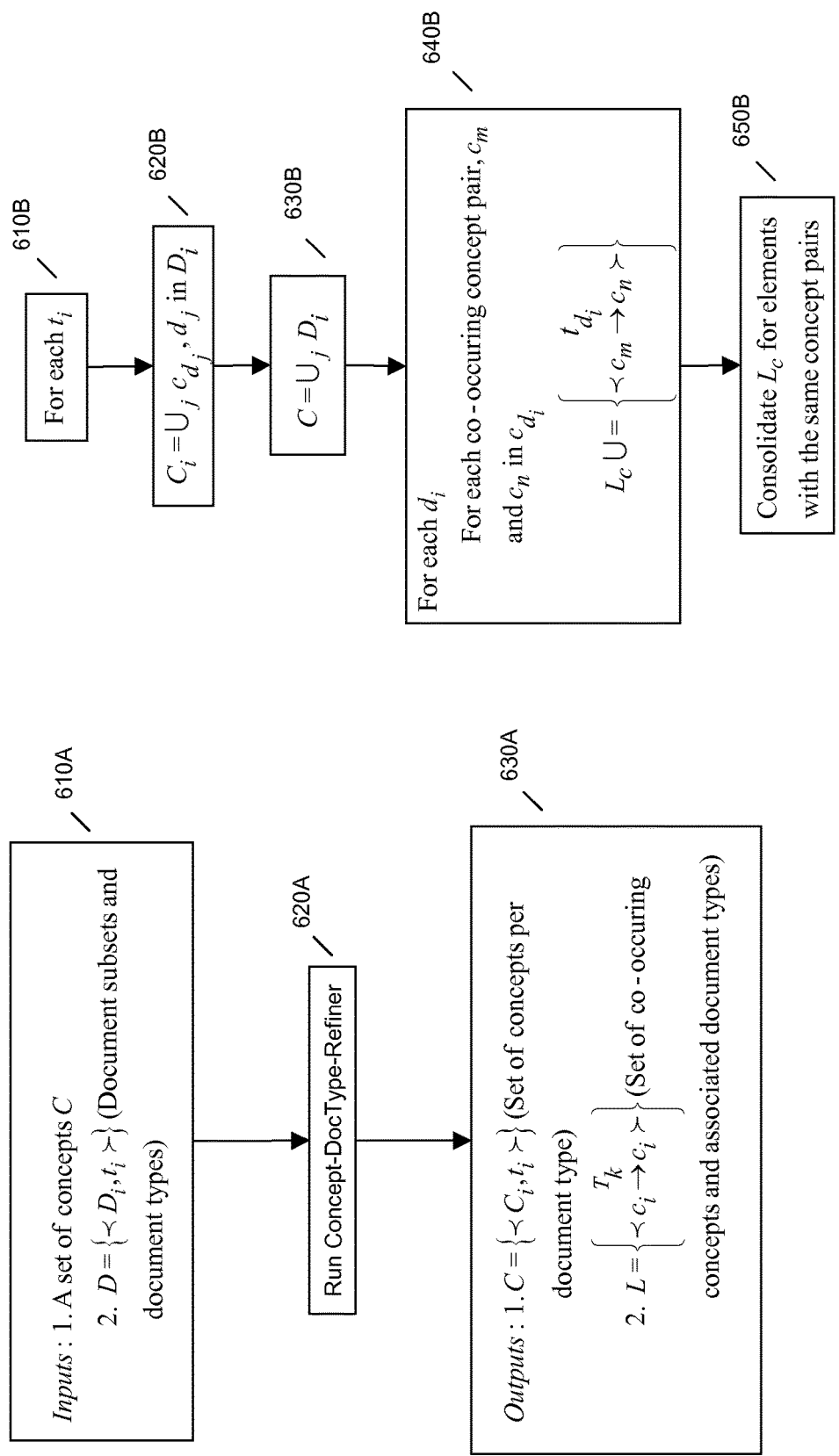
FIG. 6A-B illustrates a method for determining document types.
Figure 7:
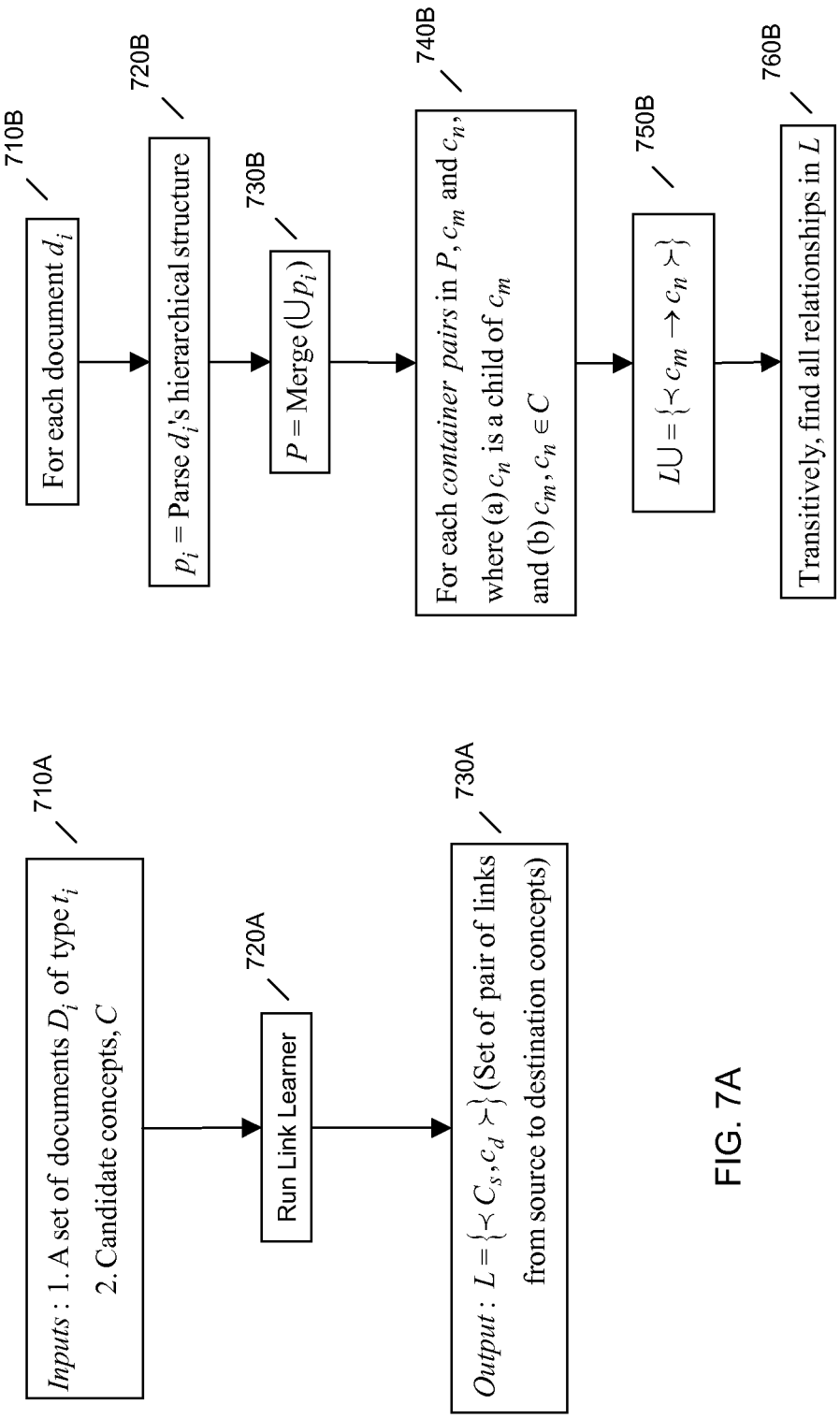
FIG. 7A-B illustrates a method for learning relationships between documents.

Next, in steps 404, 405 and 406, domain model elements (domain concepts) are discovered on the complete document pool. This has the potential to overcome the noise of individual documents and focus on candidate concepts from the global model as well as sub-models of individual document types. The candidate concepts are characterized by high support in the corresponding document collection. In steps 407 and 408, now detailed relationships (links) are learned from individual documents of each document type, but only for candidate concepts. In step 409, the sub-models are merged and finally, in step 410, the global model is output in any suitable representation. FIGS. 5-7 further elaborate on the process of learning the global model.

Learning Concepts

FIG. 5(A-B) illustrates an example Concept-Learner method used to find the potential model elements in a pool of documents (Microsoft Word® documents in this example) of potentially different document types. This corresponds to steps 401 and 404 in FIG. 4.

In a pre-processing phase (FIG. 5A), documents are input and thresholds are set 501A, and each document can be converted 502A to an XML representation. The documents are parsed 503A to identify demarcating text fragments. The fragments (characters) are then grouped along with word boundaries 504A. Paragraphs are recorded 505A. Non-textual and non-formatting content is removed 506A. Candidate concepts are then identified 507A at the paragraph boundaries.

Referring to FIG. 5B, the analysis of candidate concepts' statistical significance (identified in FIG. 5A) determines if a fragment is a potential model element. The method builds on document harvesting techniques. For example, a list of concepts in the pool and their frequency is collected 510B. Thresholds are established 520B to define fragments that are neither rare (using the LOW threshold) nor overly abundant (using the HIGH threshold). The concepts are filtered 530B and those within the thresholds are returned.

The Concept-Learner method works on the complete document pool and produces overall candidate concepts for the domain. Depending on the thresholds, it can be used to find concepts at a particular level of support in the document pool, and can be run separately to find control and guide metadata (concepts).

Illustrated in FIG. 6(A-B) is a Concept-DocType-Refiner process in which the candidate concepts are used to find sub-models by document type. This corresponds to step 406 in FIG. 4.

Referring to FIG. 6A, the inputs 610A are a set of concepts and a collection of document subsets and document types. The Concept-DocType-Refiner runs 620A and produces output 630A in the form of sub-models by document type.

Referring to FIG. 6B, step 620A is further described. The co-occurrences of sub-models in each document type $t_i$ are identified. For each document type $t_i$ 610B a set of candidate concept occurrences of type $C_i$ includes candidate concept occurrences $c_{d_j}$ for each document $d_j$ in the collection of documents $D_i$ 620B. The total candidate concepts then include 630B all candidate concept occurrences for the collection of documents $D_i$. For each document $d_i$ (640B), each co-occurring candidate concept pair $c_m$ and $c_n$ in $c_{d_i}$ are consolidated to produce a set of model elements with the same concept pairs. This provides information about direct links between model elements.

Learning Relationships

In order to find deeper links between model elements, embodiments employ a Link-Learner process, illustrated in FIG. 7(A-B). This corresponds to step 407 of FIG. 4.

In steps 710A, 720A and 730A of FIG. 7A, processing happens iteratively on each document of a document type to extract its hierarchical structure made up of content containers (for example, paragraphs, tables, et cetera) and their tree-based ordering. Thus step 710A inputs a set of documents $D_i$ of type $t_i$ and candidate concepts C. The Link-Learner process is run 720A to produce an output 730A as a set of pairs of links from source to destination concepts.

Turning to FIG. 7B, step 720A is further described. For each document type $d_i$ 710B, $d_i$'s hierarchical structure is parsed 720B. Then, the contents of all the documents are merged 730B around the trees' hierarchical structure. In steps 740B and 750B, the tree is searched for all adjacent container pairs (740B, (a)) and they are used to infer directed relationships between model elements. If the links are between candidate concepts, they are considered (740B(b)), otherwise ignored. Finally in step 760B, all relationships among included links are deduced.

In addition to learning the links, embodiments can also distinguish their different types. The following provides some examples of different link types.

Containment: The Link Learner process as shown in FIG. 7(A-B) learns only containment relationships between concepts, $c_i \in C$. Containment stems from two types of formatting elements: Section and Table. A section may contain lists, paragraphs, tables and other sections. A concept captured in a section heading is deemed to contain concepts, which are encapsulated by formatting units contained in the section. Similarly, a concept represented at the level of a table row is said to contain concepts listed at each of the cells.

Co-occurrence: The links output by Concept DocType Refiner process as shown in FIG. 6(A-B) captures co-occurrence among concepts. Furthermore, in a graph produced by Link Learner (FIG. 7(A-B)), concepts that are siblings are said to co-occur. For example, concepts in different paragraphs of the same section co-occur with each other; concepts in the various columns of a table co-occur, et cetera.

Similarity: If two nodes in the learnt graph have identical (or nearly identical) sub-trees rooted at them but the concept names discovered for them differ, then the concepts are marked as similar. Later, users may manually collapse similar nodes in the model graph if they indeed refer to the same concept (step 409 of FIG. 4).

The set of concepts $M_n$ and qualified linkages $M_e$ can be used to meaningfully index the content to drive applications such as semantic search. However, in order to create an E-R diagram and bootstrap a relational database, embodiments do the following:

Differentiate between entities and attributes: As a simple rule, embodiments may treat all concept nodes with only one incoming link to be attributes and other concepts to be entities. However, manual review and correction may be necessary.

Define cardinalities on relationships: Formatting cues can help infer cardinalities to a large extent. For example, if a concept B is represented as a bulleted or numbered list, which is present in a section hosting concept A, then the link from A to B is said to have a cardinality of 1: n because many items of B may be contained in a single A. On the other hand, if B is captured as a paragraph inside section A, then Cardinality(A→B) will be 1: n, unless multiple instances of such paragraphs are found inside the section. Similarly, a concept underlying a section has a cardinality 1:n with a concept emergent in a table contained in the section. Cardinalities of the nature n:n are defined when aggregating across sub-models.

Aggregating Sub-Models

As a result of the Concept Learner process, one can learn the concepts in the aggregated (global) model across all the document types. However, since the Link Learner process runs separately on each document type, embodiments learn sub-models corresponding to each document type. In order to learn the overall model (many document types), embodiments aggregate links across the sub-models.

Assuming that concept names are unique and unambiguous in the domain of discourse, links across all the document types can be simply collected together to get the full inter-relationships for domain concepts. The global model can be created by selecting concepts and links from different sub-routines, Concept Learner, Link Learner, Concept-Doc-Type-Refiner, or a combination, following different strategies depending on the level of human review available on the output. Some example strategies are described below.

A conservative strategy includes as output only concepts that were common in the output of all sub-routines, and the links are only for these concepts as returned by Link Learner. In a moderate strategy, no concept from Concept Learner is dropped. In an aggressive strategy, all links found Concept Learner are also returned.

Conservative Strategy:

$$M_{global} = \left( M_n^{ConceptLearner} \cap \left( \bigcup_{t_i} M_n^{LinkLearner} \right), \bigcup_{t_i} M_e^{LinkLearner} \right) \quad (1)$$

Moderate Strategy:

$$M_{global} = \left( M_n^{ConceptLearner}, \bigcup_{t_i} M_e^{LinkLearner} \right) \quad (2)$$

Aggressive Strategy:

$$M_{global} = \left( M_n^{ConceptLearner}, \left( M_e^{ConceptDocTypeRefiner} \cup \left( \bigcup_{t_i} M_e^{LinkLearner} \right) \right) \right) \quad (3)$$

Nature of Manual Review

As the Learn-Model process (FIG. 4) has built in steps for manual review, some description regarding the type of judgments done at each step is now provided.

Step 402: One validates control metadata that is used to structure content regardless of content. Control metadata can be considered as document template concepts.

Step 405: One identifies concepts that need to be suppressed because either they are sensitive (for example, for client documents) or frivolous (for example, text used to format document).

Step 409: One decides whether to allow concepts to have self-loops or not; characterizes the type of links; and resolves incorrect links which are possible if the (above mentioned) unique name assumption does not hold.

In addition, the raised (HIGH) and reduced (LOW) threshold used in Concept Learner (FIG. 5(A-B)) allows for human judgment, but does not seem to have an impact across the datasets so far considered with prototype embodiments. Finally, the aggregation strategy is decided for step 408, taking into consideration the time expert(s) can spend to review the output.

Representation of Output

As noted herein, the output model M is a graph with nodes ($M_n$) representing concepts and edges ($M_e$) representing relationships between nodes. The edges can be undirected (for example, in the case of co-occurrence) or directed (for example, output of Link-Learner). Embodiments present M as a graph but can convert it into another representation depending on usage.

Figure 8:
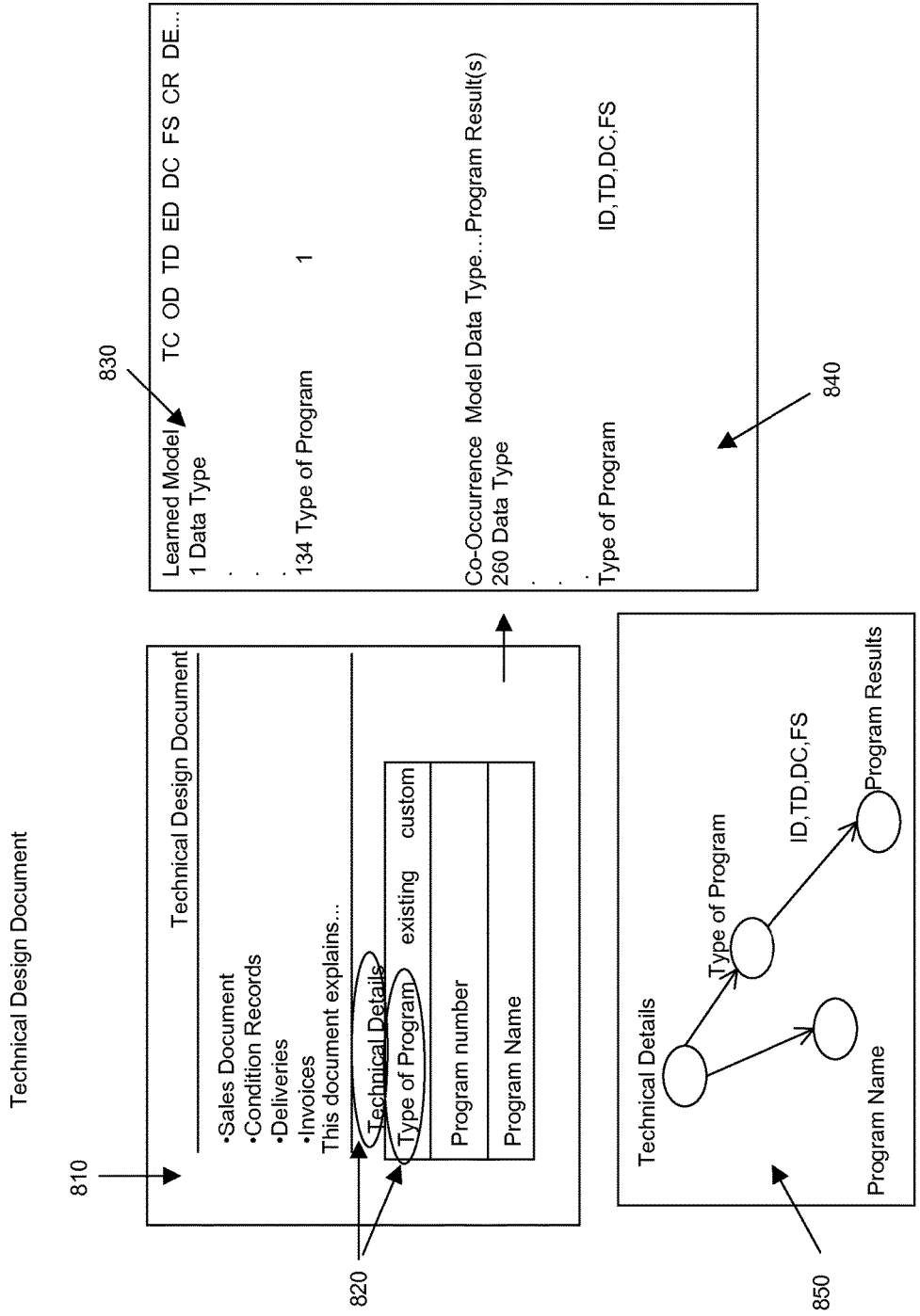
FIG. 8 illustrates an example implementation of global model construction.
Figure 9:
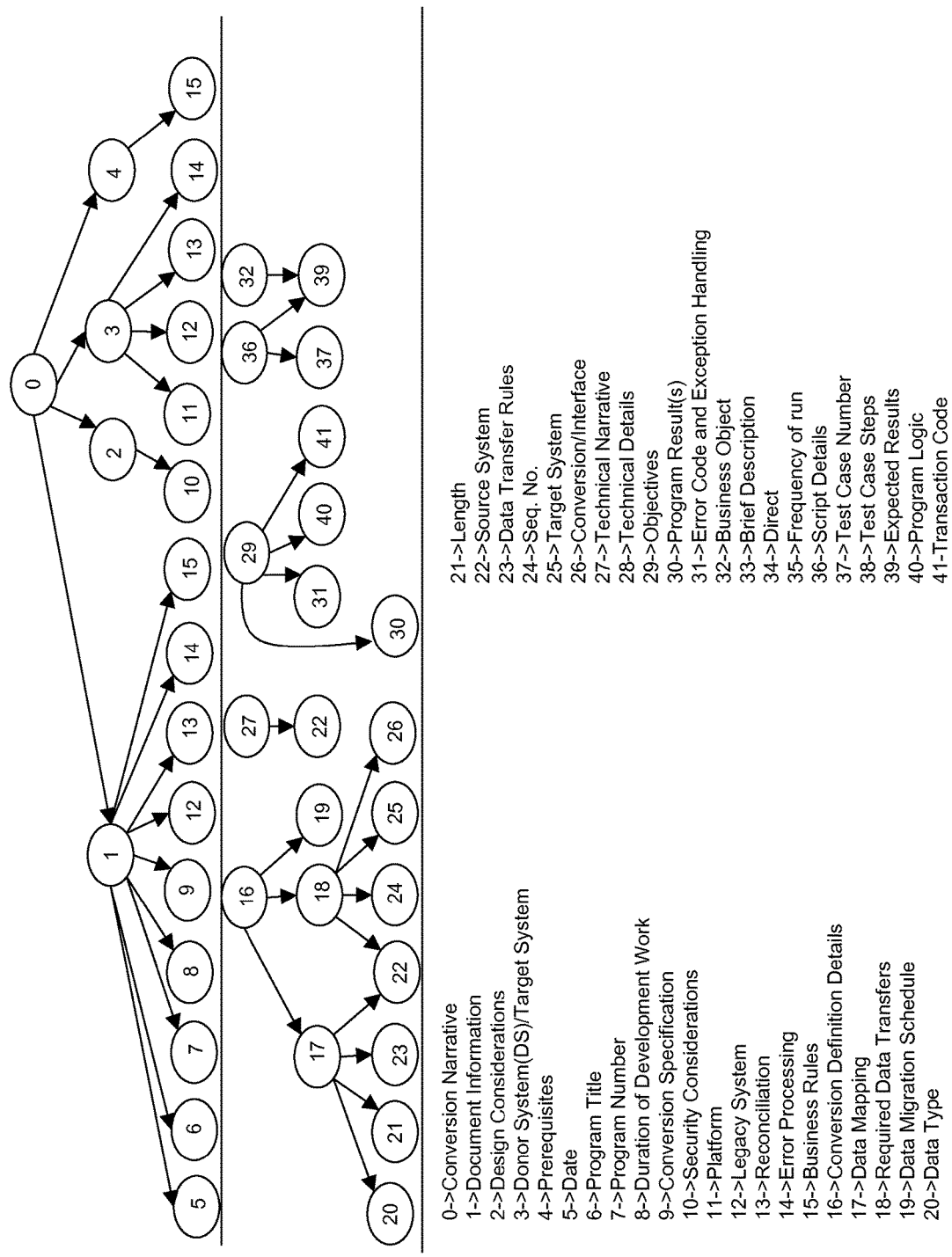
FIG. 9 illustrates an example model.

FIG. 8 illustrates an example implementation of the Learn-Model process (FIG. 4). First, a sample document 810 is shown, wherein possible 820 concepts are circled. With Concept-Learner (FIG. 5A-B), concepts are learned (upper right spread sheet 830) and with Concept-DocType-Refiner (FIG. 6A-B), the co-occurrence among concepts are shown (lower right spreadsheet 840). At the bottom left of FIG. 8, a learned model fragment 850 for the document is shown. The output of Learn-Model for a sample set of documents, consisting of different document types, is shown in FIG. 9. The sample output (shown here as a forest—a collection of trees) represents the different concepts as nodes and shows the relationships as edges. For example, Conversion Definition Details (16) is a concept that is further composed of sub-concepts like Data Mapping (17), Required Data Transfers (18) and Data Migration Schedule (19).

Accordingly, example embodiments help extract an information model from a collection of documents. The information model identifies the key information concepts of a domain as inferred from the documents and the relationship between different concepts. Existence of this information model is a pre-requisite to be able to capture and store structured data. Embodiments can store the inferred information model as an Eclipse Modeling Framework (EMF) model. Among other uses, embodiments are useful for providing an inferred information model for generation of structured content, advanced content search, and content extraction from documents in structured format.

Figure 10:
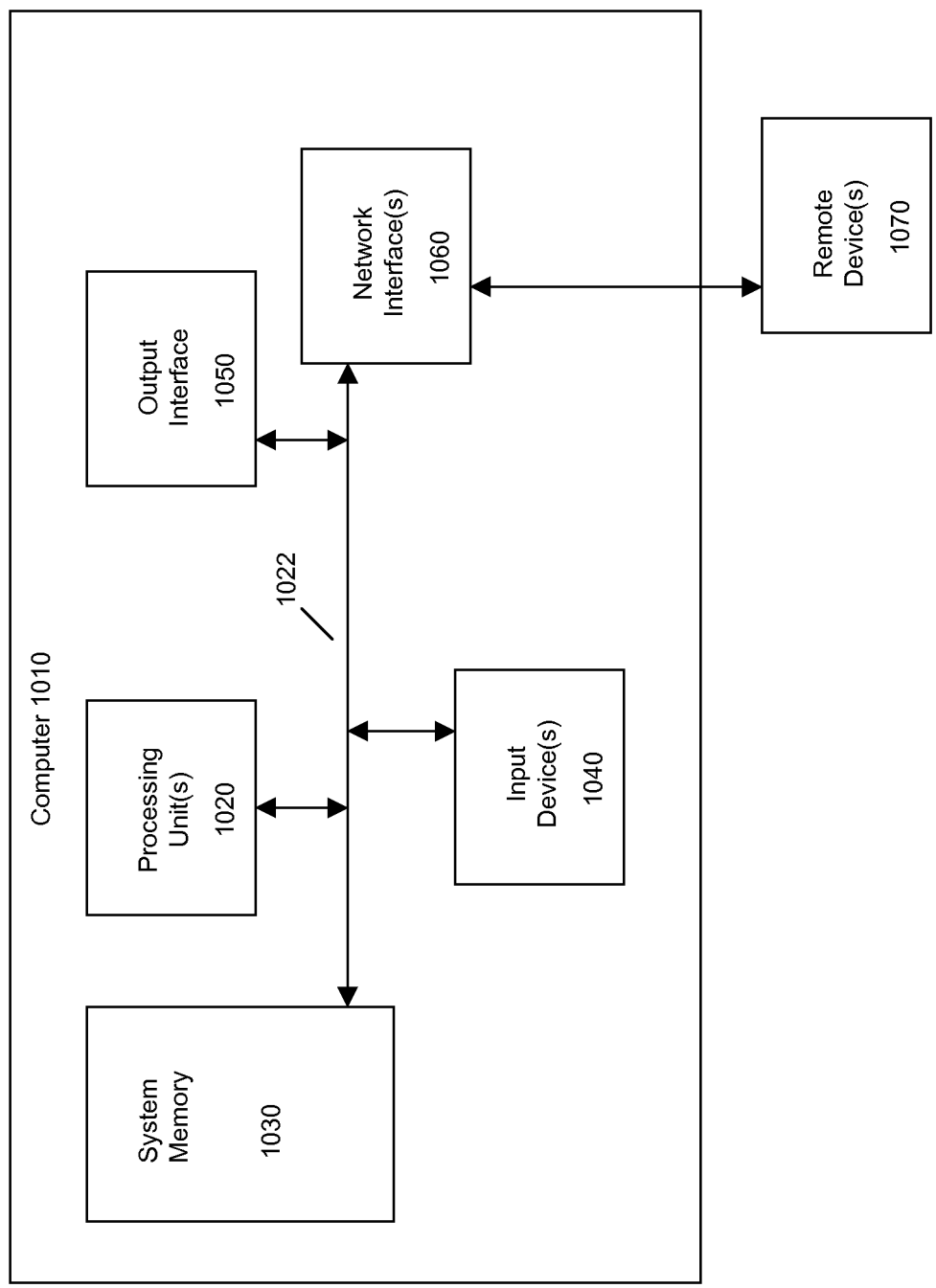
FIG. 10 illustrates an example computer system.

Referring to FIG. 10, it will be readily understood that certain embodiments can be implemented using any of a wide variety of devices or combinations of devices. An example device that may be used in implementing one or more embodiments includes a computing device in the form of a computer 1010. In this regard, the computer 1010 may execute program instructions configured to access a collection of documents, learn concepts and relations there-between, learn a global model for the document collection, and perform other functionality of the embodiments, as described herein.

Components of computer 1010 may include, but are not limited to, a processing unit 1020, a system memory 1030, and a system bus 1022 that couples various system components including the system memory 1030 to the processing unit 1020. The computer 1010 may include or have access to a variety of computer readable media. The system memory 1030 may include computer readable storage media in the form of volatile and/or nonvolatile memory such as read only memory (ROM) and/or random access memory (RAM). By way of example, and not limitation, system memory 1030 may also include an operating system, application programs, other program modules, and program data.

A user can interface with (for example, enter commands and information) the computer 1010 through input devices 1040. A monitor or other type of device can also be connected to the system bus 1022 via an interface, such as an output interface 1050. In addition to a monitor, computers may also include other peripheral output devices. The computer 1010 may operate in a networked or distributed environment using logical connections (1060) to one or more other remote computers or databases (1070). The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method for producing a global model describing a collection of documents comprising:

executing with one or more processors one or more modules of computer program code configured for accessing a collection of documents, the collection of documents comprising labeled documents and unlabeled documents;

receiving input of at least one indicative word, wherein the at least one indicative word comprises a descriptive word for classification and wherein the at least one indicative word indicates a probability of belonging to a classification based upon the indicative word occurring in a document during classification;

classifying both labeled documents and unlabeled documents of the collection of documents to produce classified documents of one or more types, wherein the classifying comprises producing a domain sub-model for each document type, wherein the domain sub-model represents a graphical representation of a set of concepts contained within each document type and wherein the domain sub-model is generated using the labeled documents and the at least one indicative word;

wherein the producing a domain sub-model for each document type comprises extracting concepts from each of the documents and determining relationships between the concepts, wherein the extracting concepts comprises producing concept pairs by identifying, within the collection of documents, co-occurring candidate concepts and wherein the determining relationships between the concepts comprises identifying relationship links between source and destination candidate concepts, wherein the identifying relationship links comprises extracting, from each of the documents of the collection of documents, a hierarchical structure, searching for adjacent container pairs within the hierarchical structures, and inferring directed relationships between elements within the adjacent container pairs;

thereupon generating a global domain model for the documents of the collection of the documents by merging the produced domain sub-models, based on the relationships between the concepts;

said generating of a global domain model comprising aggregating identified relationship links and corresponding concepts of each of the domain sub-models across the produced domain sub-models, wherein the relationship links and corresponding concepts selected for aggregation are based upon a strategy identified based upon a level of manual review;

thereupon outputting the global model as a graphical representation comprising the aggregated concepts and relationship links between concepts;

ascertaining one or more changes to the collection of documents; and generating a new global model based on the one or more changes to the collection of documents by reclassifying the collection of documents and generating a new global model using the new domain sub-models generated during reclassification of the collection of documents.

2. The method according to claim 1, wherein:

the documents correspond to a plurality of document types; and said extracting of concepts from the classified documents further comprises identifying concepts and links for each document type.

3. The method according to claim 2, wherein the document types correspond to at least one of: differing domains; and differing classification models.

4. The method according to claim 1, further comprising accepting user input indicating one or more of threshold input and validation input.

5. The method according to claim 1, wherein the global model is output as a graph, the graph comprising a tree structure wherein nodes represent concepts and edges represent relationships between concepts.

6. A computer program product for producing a global model describing a collection of documents comprising:
   a non-transitory computer readable storage medium having computer readable program code embodied therewith, the computer readable program code comprising:
   computer readable program code configured to access a collection of documents, the collection of documents comprising labeled documents and unlabeled documents;
   computer readable program code configured to receive input of at least one indicative word, wherein the at least one indicative word comprises a descriptive word for classification and wherein the at least one indicative word indicates a probability of belonging to a classification based upon the indicative word occurring in a document during classification;
   computer readable program code configured to classify both labeled documents and unlabeled documents of the collection of documents to produce classified documents of one or more types, via producing a domain sub-model for each document type, wherein the domain sub-model represents a graphical representation of a set of concepts contained within each document type and wherein the domain sub-model is generated using the labeled documents and the at least one indicative word;
   wherein the producing a domain sub-model for each document type comprises extracting concepts from each of the documents and determine relationships between the concepts, wherein the extracting concepts comprises producing concept pairs by identifying, within the collection of documents, co-occurring candidate concepts and wherein the determining relationships between the concepts comprises identifying relationship links between source and destination candidate concepts, wherein the identifying relationship links comprises extracting, from each of the documents of the collection of documents, a hierarchical structure, searching for adjacent container pairs within the hierarchical structures, and inferring directed relationships between elements within the adjacent container pairs;
   computer readable program code configured to thereupon generate a global domain model for the documents of the collection of the documents by merging the produced domain sub-models, based on the relationships between the concepts, via aggregating identified relationship links and corresponding concepts of each of the domain sub-models across the produced domain sub-models, wherein the relationship links and corresponding concepts selected for aggregation are based upon a strategy identified based upon a level of manual review;
   computer readable program code configured to thereupon output the global model as a graphical representation comprising the aggregated concepts and relationship links between concepts;
   computer readable program code configured to ascertain one or more changes to the collection of documents; and
   computer readable program code configured to generate a new global model based on the one or more changes to the collection of documents by reclassifying the collection of documents and generating a new global model using the new domain sub-models generated during reclassification of the collection of documents.

7. The computer product according to claim 6, wherein the documents correspond to a plurality of document types, and said computer readable program code is configured to extract concepts from the classified documents via identifying concepts and links for each document type.

8. The computer program product according to claim 6, further comprising computer readable program code configured to ascertain user input indicating one or more of threshold input and validation input.

9. The computer program product according to claim 6, wherein the global model is output as a graph, the graph comprising a tree structure wherein nodes represent concepts and edges represent relationships between concepts.

10. A system for producing a global model describing a collection of documents comprising:
    one or more processors; and
    a memory operatively connected to the one or more processors;
    wherein, responsive to execution of computer readable program code accessible to the one or more processors, the one or more processors are configured to:
    access a collection of documents, the collection of documents comprising labeled documents and unlabeled documents;
    receive input of at least one indicative word, wherein the at least one indicative word comprises a descriptive word for classification and wherein the at least one indicative word indicates a probability of belonging to a classification based upon the indicative word occurring in a document during classification;
    classify both labeled documents and unlabeled documents of the collection of documents to produce classified documents of one or more types, via producing a domain sub-model for each document type, wherein the domain sub-model represents a graphical representation of a set of concepts contained within each document type and wherein the domain sub-model is generated using the labeled documents and the at least one indicative word;
    wherein the producing a domain sub-model for each document type comprises extracting concepts from each of the documents and determine relationships between the concepts, wherein to extract concepts comprises producing concept pairs by identifying, within the collection of documents, co-occurring candidate concepts and wherein the determining relationships between the concepts comprises identifying relationship links between source and destination candidate concepts, wherein the identifying relationship links comprises extracting, from each of the documents of the collection of documents, a hierarchical structure, searching for adjacent container pairs within the hierarchical structures, and inferring directed relationships between elements within the adjacent container pairs;

thereupon generate a global domain model for the documents of the collection of the documents by merging the produced domain sub-models, based on the relationships between the concepts;

the generating of a global model comprising aggregating identified relationship links and corresponding concepts of each of the domain sub-models across the produced domain sub-models, wherein the relationship links and corresponding concepts selected for aggregation are based upon a strategy identified based upon a level of manual review;

thereupon output the global model as a graphical representation comprising the aggregated concepts and relationship links between concepts;

ascertain one or more changes to the collection of documents; and generate a new global model based on the one or more changes to the collection of documents by reclassifying the collection of documents and generating a new global model using the new domain sub-models generated during reclassification of the collection of documents.

* * * * *